Figure 1:
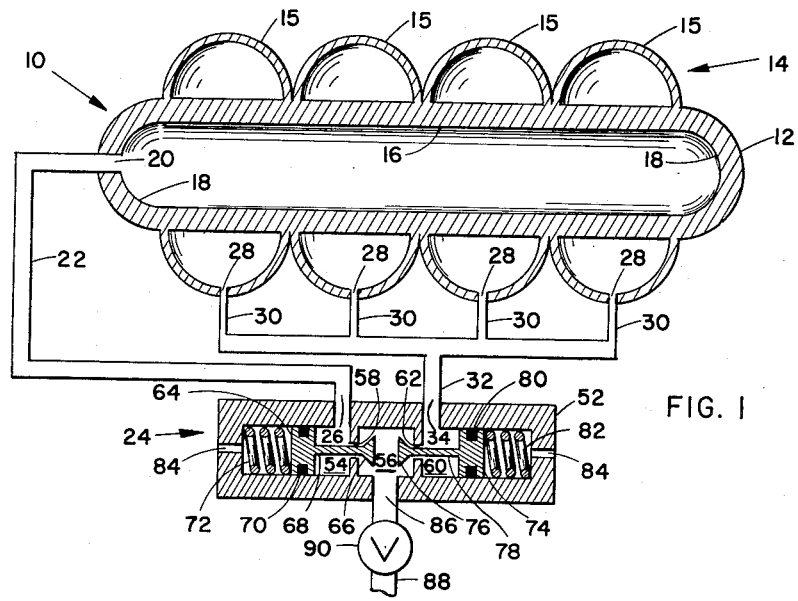

July 17, 1962   J. H. CREIGHTON   3,044,654
HIGH PRESSURE VESSEL
Filed July 1, 1958

INVENTOR.
JOHN H. CREIGHTON
BY
ATTORNEY

United States Patent Office 3,044,654
Patented July 17, 1962

3,044,654
HIGH PRESSURE VESSEL
John H. Creighton, Davenport, Iowa, assignor to The Bendix Corporation, a corporation of Delaware
Filed July 1, 1958, Ser. No. 745,859
1 Claim. (Cl. 220—3)

This invention relates to high pressure vessels and more particularly to vessels having a vessel weight to weight of fluid capacity ratio equivalent to or approaching that of a spherical vessel, but which vessels are not limited to spherical shapes.

The ideal vessel shape for obtaining a low ratio is spherical. Where the space allowed for a vessel does not permit the use of a sphere, a vessel of another shape must be employed and a higher ratio will result. In many applications, such as use in a high performance aircraft and missiles, the non-spherically shaped vessel will be required to have a low ratio which is equal to or approaching that obtained in a spherical vessel.

The present invention has as one of its objects the provision of a non-spherically shaped, high pressure vessel having a low vessel weight to weight of fluid capacity ratio approaching the ratio which is possible in a spherical vessel.

A further object of the present invention is to provide a high pressure vessel having two containers; an inner container and an outer container. To this end the containers are so designed that when the containers are filled to their maximum pressure, the stress in all the container walls will be equal.

The present invention also has as one of its objects the use of a common wall for the inner and outer containers. The pressure in the outer container partially offsets the pressure in the inner container and allows the use of a thinner common wall and thus a lower vessel weight to weight of fluid capacity ratio.

A still further object of the instant invention is to provide means for maintaining the proper pressure relationship between the inner and outer containers and thereby preventing the stress in the common wall from exceeding its maximum allowable stress.

The foregoing and other objects and advantages of the invention will appear more fully from the following description of an embodiment of the invention and a modification thereof illustrated in the accompanying drawings. It is to be expressly understood that various modifications other than those shown may be made in the embodiment and modification illustrated and that other embodiments are possible without departing from the spirit of the invention or the scope of the appended claim.

Figure 2:
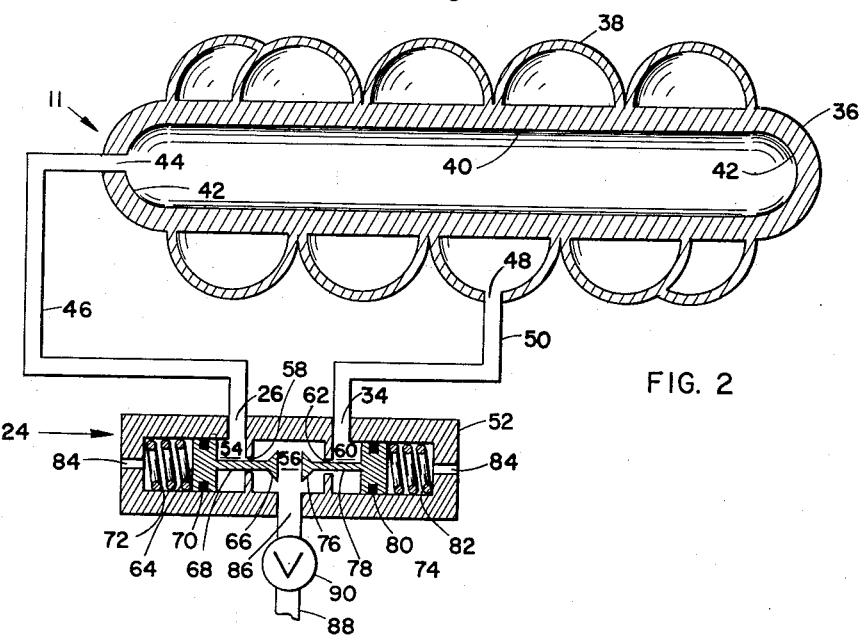

In the drawings:

FIG. 1 is a longitudinal section through a high pressure vessel and pressure controller embodying the invention; and FIG. 2 is a longitudinal section through the pressure controller and a modified form of the high pressure vessel of FIG. 1.

The usual reason why a spherical vessel is not satisfactory in a given application, is the need to have one dimension of the vessel smaller than another. Where the capacity requirement is unchanged, making one dimension smaller means that another dimension must be made greater. The result of this change is to increase the stress, for a given contained pressure, to which some or all of the walls are subjected whereby an increase in wall thickness is made necessary, resulting in a poor ratio of fluid capacity to vessel weight. In the invention this result is minimized or avoided.

The spherical vessel is advantageously formed by elongation and reduction in diameter to form a cylindrical container with substantially hemispherical end closures or caps; the cylindrical portion being encompassed by a second container. Subjected to pressure, the cylindrical wall of the inner container experiences twice the stress per unit area than does its end closures, making it necessary, if the full strength of the end closures is to be utilized, to provide additional support at the cylindrical wall.

This could be accomplished by making the wall thicker, but only with the result that additional weight is added to contain the pressure without added capacity. In the invention, the required additional support is provided by adding more wall to the cylindrical portion of the container but the added wall is spaced from the cylindrical wall, thus providing added fluid capacity. Fluid is forced into the space between the walls under pressure so that the maximum amount of fluid is there contained and so that its pressure opposes the pressure within the cylindrical inner container and prevents rupture of the inner container wall. Advantageously the added wall is substantially semi-circular in cross section for maximum strength.

Practical forms of vessels made according to the invention will be formed of the same material throughout and most advantageously with a cylindrical wall of the same thickness as its end closures. The embodiment and modification selected for illustration have this form. Vessels in which the walls are made of different materials or in differing thickness are possible and their construction according to the invention will be apparent to those skilled in the art.

When, as illustrated in the drawings, the cylindrical walls are made of a material having the same unit strength and thickness as its end closures, the end wall can withstand twice as much pressure as the cylindrical wall. If the maximum pressure is to be contained, an opposing pressure equivalent to half the maximum pressure must be applied at the outer surface of the cylindrical wall. This particular pressure relationship is desirable because it makes maximum use of the strength of the cylindrical wall.

An outer wall is added to contain this opposing pressure, the outer wall forming an outer container encompassing the inner cylindrical container. The outer container is shaped to realize an advantageous vessel weight to weight of fluid capacity ratio. The most advantageous shape for the outer container is semi-circular in cross-section. In the example, wherein the opposing pressure is one half of the pressure in the cylindrical container, the wall thickness of the outer container need be only one half that of the inner container if formed of material of equal unit strength and equal radius.

The walls of the resulting vessel, when fully pressurized, are everywhere uniformly stressed and its outer walls have the best shape for a low vessel weight to weight of fluid capacity ratio and the lack of best shape in the cylindrical wall is fully compensated.

It is preferred that the wall of the outer vessel form nearly a segment of a circle in cross section, preferably a semi-circle, but more than one section may be employed, as shown.

Referring now to the drawing and particularly to the embodiment shown in FIG. 1, the reference character 10 designates a high pressure vessel having an inner container 12 and an outer container 14 comprising four toroidal sections 15. The inner container 12 has a substantially cylindrical portion 16 and a pair of substantially hemispherical end closures or caps 18. The toroidal units 15 of the outer container 14 are shown identical and of semi-circular cross-section, but may be different in shape within the scope of the invention. The cylindrical portion 16 of the inner container 12 is a common wall for both the inner container 12 and the outer container 14. The outer containers 14 encompass the entire cylindrical portion 16 of the inner container 12.

The inner container 12 has an outlet 20 in one of the hemispherical end closures or caps 18. High pressure line 22 is connected to the outlet 20 and enters the pressure regulator 24 at the high pressure inlet 26. The outer container 14 has outlets 28 in the toroidal sections 15. The intermediate pressure lines 30 are connected to the outlets 28 and join in intermediate pressure line 32 which enters regulator 24 at intermediate pressure inlet 34.

Referring to FIG. 1 and particularly to the pressure regulator 24 which has a housing 52 having high pressure inlet 26 and intermediate pressure inlet 34. The high pressure inlet 26 opens into high pressure chamber 54, which chamber is in direct communication with supply chamber 56 through passageway 58. The intermediate pressure inlet 34 opens into intermediate pressure chamber 60, which chamber is in direct communication with supply chamber 56 through passageway 62.

Valve head 64 is disposed in the high pressure chamber 54. The valve stem head 66 is disposed in supply chamber 56 and is joined to the valve head by valve stem 68. Valve head 64 is provided with seal 70. The high pressure spring 72 extends between the housing 52 and valve head 64. Valve head 74 is disposed in the intermediate pressure chamber 60. The valve stem head 76 is disposed in supply chamber 56 and is joined to the valve head by valve stem 78. Valve head 74 is provided with seal 80. The intermediate pressure spring 82 extends between the housing 52 and valve head 74.

The housing 52 is provided with pressure relief ports 84. Supply chamber 56 is open to the supply inlet 86 and supply line 88. Shut-off valve 90 is in supply line 88 and is joined to a fluid source or a utilization apparatus (not shown).

Having described the details of construction and the arrangement of the components of the novel pressure vessel contemplated herein, the operation of the embodiment of the invention shown in FIGURE 1 is as follows:

When filling the pressure vessel 10, supply line 88 is connected to a fluid source, and shut-off valve 90 is opened to give the desired rate of fluid flow. Fluid passes into the pressure regulator 24 through supply inlet 86 and into supply chamber 56.

Both valves in the regulator are open and supply chamber 56 is in direct communication with high pressure chamber 54 and intermediate pressure chamber 60. Fluid from the supply chamber 56 flows around valve stem head 66 through passageway 58 and into high pressure chamber 54, then through high pressure inlet 26 into high pressure line 22 which is connected to outlet 20 of the inner container 12. Simultaneously with the above flow, fluid from the supply chamber 56 flows around valve stem head 76 through passageway 62 and into intermediate pressure chamber 60, then through intermediate pressure inlet 34 to intermediate pressure line 32 and then into intermediate lines 30 which are connected to outlets 28 of outer containers 14.

Fluid pressure will build up in both the inner container 12 and the outer container 14 until the pressure in the outer container 14 reaches its maximum design pressure as regulated by pressure regulator 24. The same pressure will be present in the outer container 14, intermediate pressure chamber 60 and supply chamber 56. The pressure in supply chamber 56 acting on valve stem head 76 and the pressure in intermediate pressure chamber 60 acting on valve head 74 will overcome the resisting force of the intermediate pressure spring 82 and passageway 62 will close upon the seating of valve stem head 76.

The fluid pressure in supply chamber 56 will continue to build up as will the pressure in the inner container 12 until the container reaches its maximum design pressure as regulated by pressure regulator 24. The same pressure will be present in supply chamber 56, high pressure chamber 54 and inner container 12. The pressure in supply chamber 56 acting on valve stem head 66 and the pressure in high pressure chamber 54 acting on valve head 64 will overcome the resisting force of the high pressure spring 72 and passageway 58 will close upon the seating of valve stem head 66.

The shut-off valve 90 is closed and supply line 88 is disconnected from the fluid source.

In using the fluid stored in the high pressure vessel 10 the supply line 88 is connected to the fluid using apparatus and shut-off valve 90 is opened. Upon demand for fluid by the fluid using apparatus a decrease in pressure will result in supply chamber 56. The decrease in pressure on the valve stem head 66 will decrease the resistance on high pressure spring 72 and allow it to expand. Valve stem head 66 will unseat and passageway 58 will be open, supply chamber 56, high pressure chamber 54 and the inner container 12 will then be at the same fluid pressure.

On continued use of the fluid the pressure in supply chamber 56 and high pressure chamber 54 will decrease creating a continual movement of the high pressure valve until the high pressure spring 72 is fully expanded. When the pressure in high pressure container 12 is reduced to the pressure in the outer container 14 the pressure in supply chamber 56 and intermediate pressure chamber 60 will be equal.

A decrease in pressure in supply chamber 56 below the pressure in intermediate pressure chamber 60 will decrease the pressure on valve stem head 76 and reduce the resistance to expansions on intermediate pressure spring 82. Upon the expansion of spring 82 valve stem head 76 will unseat and passageway 62 will be open. The pressure in supply chamber 56 and intermediate pressure chamber 60 will balance. With the use of fluid the intermediate pressure valve will continually move until the intermediate pressure spring is fully expanded.

The pressures in supply chamber 56, intermediate pressure chamber 60 and high pressure chamber 54 will become equal upon the opening of an intermediate pressure valve. Fluid will now be taken from both the inner container 12 and the outer container 14 upon demand from the fluid using apparatus.

Referring now to FIG. 2 which is a modification of the embodiment of the invention shown in FIG. 1. Reference character 11 designates the high pressure vessel. The pressure vessel of FIG. 2 differs from the pressure vessel of FIG. 1 only in the outer container 38 and the intermediate pressure line 50 from the outer container 38 to the pressure regulator 24.

The inner container 36 has a substantially cylindrical portion 40 and a pair of substantially hemispherical end closures or caps 42. The outer container 38 is a helical container of semi-circular cross section. The cylindrical portion 40 of the inner container 36 is a common wall for both the inner container 36 and the outer container 38. The outer container 38 encompasses the entire cylindrical portion 40 of container 36.

The inner container 36 has an outlet 44 in one of the hemispherical end closures 42. High pressure line 46 is connected to the outlet 44 and enters the pressure regulator 24 at the high pressure inlet 26. The outer container has an outlet 48, the intermediate pressure line 50 is connected to the outlet 48 and enters the regulator 24 at the intermediate pressure inlet 34.

The modification of the invention presented in FIGURE 2 will operate in the same manner as the embodiment presented in FIGURE 1 as explained above. The modification presented in FIGURE 2 uses a helical container 38 of semi-circular cross-section as an outer container in place of the outer container 14 which comprises toroidal units 15 of semi-circular cross-section. The modification in FIGURE 2 uses only one intermediate pressure line 50, replacing the intermediate pressure lines 30 and 32 in the embodiment described.

While the pressure vessel 10 shown in FIGS. 1 and 2 are of the construction shown and described, it is understood that the instant invention is not limited to any particular form or dimension. Moreover, other changes and modifications of the novel pressure vessel contemplated herein may be made by those skilled in the art without departing from the scope of the instant invention.

I claim:

A pressure vessel comprising an inner container including a substantially cylindrical section and substantially hemispherical end closures and an outer helical container of substantially semi-circular cross-section embracing and covering the entire outer surface of the cylindrical section of said inner container, said cylindrical section forming a common wall for said inner container and said outer container, the strength per unit area of said hemispherical end closures being substantially twice the strength per unit area of said cylindrical section and said helical container, and means for limiting the pressure in said inner container to substantially twice the maximum pressure in said outer container.

References Cited in the file of this patent

UNITED STATES PATENTS

| | | |
|---|---|---|
| 339,885 | Hill | Apr. 13, 1886 |
| 1,692,670 | Mesurier | Nov. 20, 1928 |
| 2,280,501 | Stephenson | Apr. 21, 1942 |
| 2,314,442 | Cook | Mar. 23, 1943 |
| 2,366,140 | Alderfer | Dec. 26, 1944 |
| 2,370,614 | Bohm | Mar. 6, 1945 |
| 2,370,677 | Mapes | Mar. 6, 1945 |
| 2,844,271 | Shelton | July 22, 1958 |

FOREIGN PATENTS

| | | |
|---|---|---|
| 38,787 | Denmark | May 9, 1928 |
| 567,443 | Germany | Jan. 2, 1933 |
| 606,684 | Great Britain | Aug. 18, 1948 |